United States Patent
Chou et al.

(10) Patent No.: US 6,740,436 B2
(45) Date of Patent: May 25, 2004

(54) HYDROGEN/OXYGEN GENERATING SYSTEM WITH TEMPERATURE CONTROL

(75) Inventors: Nai Sung Chou, Severna Park, MD (US); Choi Shiu Sum, Thornhill (CA); Chou Te-Hung, Severna Park, MD (US); Hui Lin, Reston, VA (US)

(73) Assignee: Natural Energy Resources, Severn, MD (US)

(*) Notice: Subject to any disclaimer, the term of this patent is extended or adjusted under 35 U.S.C. 154(b) by 0 days.

(21) Appl. No.: 10/644,784

(22) Filed: Aug. 21, 2003

(65) Prior Publication Data

US 2004/0038096 A1 Feb. 26, 2004

Related U.S. Application Data

(60) Provisional application No. 60/404,917, filed on Aug. 22, 2002.

(51) Int. Cl.[7] .................................................. H01M 8/18
(52) U.S. Cl. ........................... 429/21; 429/22; 429/25; 429/23; 429/26; 429/34; 429/35; 429/46; 204/228.5; 204/239; 204/241; 204/256; 204/268; 204/270
(58) Field of Search .................................. 429/17, 21, 22, 429/25, 23, 26, 34, 35, 46; 204/228.5, 239, 241, 256, 268, 270

(56) References Cited

U.S. PATENT DOCUMENTS

| | | | | |
|---|---|---|---|---|
| 3,652,431 A | * | 3/1972 | Reynolds | 205/338 |
| 4,077,863 A | * | 3/1978 | Nasser | 204/268 |
| 4,081,656 A | * | 3/1978 | Brown | 219/137.31 |
| 5,244,558 A | * | 9/1993 | Chiang | 204/241 |
| 5,277,994 A | * | 1/1994 | Sprouse | 429/17 |
| 5,888,361 A | * | 3/1999 | Hirai et al. | 204/262 |

FOREIGN PATENT DOCUMENTS

FR          2 723 593 A3 * 2/1996 ............. C25B/1/04

* cited by examiner

*Primary Examiner*—Zeinab El-Arini
*Assistant Examiner*—Gentle E. Winter
(74) *Attorney, Agent, or Firm*—Isaac A. Angres

(57) ABSTRACT

A mixed hydrogen-oxygen fuel generator system uses an electrolytic solution to generate gaseous hydrogen-oxygen fuel through the electrolysis of water. This generator system includes: at least one electrolytic cell with multiple metallic plates used as an internal isolation system in which two of the plates separately connect to both the positive and negative terminal of a DC circuit. These plates are used for the electrolysis of the electrolytic solution in the cell(s) to produce, under pressure, mixed hydrogen-oxygen fuel. The apparatus also includes a cooling system containing a water cooling tank in which there are two zones: one is the electrolytic solution circulation coil and the another is a water circulation zone. The cooler provides the circulating, cooling water used to adjust the temperature of the operating cell and of the electrolyte solution to within a given temperature range in order to ensure that the cell is not affected by excessively elevated temperatures that can stop operations due to cell overheating. Another effect of this cooling system is to precipitate moisture out of the generated gas products. The ignition flame temperature of the gaseous fuel produced can be adjusted for specific applications by passage of the hydrogen/oxygen gas stream through a temperature-control fluid. Thus, continuous 24 hours operation can be achieved along with better gas production efficiency and fuel cell energy generation.

20 Claims, 5 Drawing Sheets

HYDROGEN/OXYGEN GENERATING SYSTEM WITH TEMPERATURE CONTROL

This application claims the priority benefit under 35 U.S.C. section 119 of U.S. Provisional Patent Application No. 60/404,917 entitled "Hydrogen-Oxygen Generating System with Temperature Control", filed Aug. 22, 2002, which is in its entirety herein incorporated by reference.

BACKGROUND OF THE INVENTION

Systems conventionally used to generate hydrogen and oxygen gases from the electrolysis of water and collect the combined product gases produced in a closed electrolytic chamber have several inherent weaknesses. Given the design of the electrolytic rods, such a system consumes large amounts of electricity.

Another weakness with conventional systems is in the cooling process which is not ideal because it only uses the cooling effect of a cooling fan to lower the temperature of the electrolytic solution in the electrolytic chamber. As a result, the gas production operation often stops because of overheating.

A third shortcoming of such a conventional hydrogen-oxygen generating system is that the combustion flame temperature is fixed, and therefore cannot be adjusted to the requirements of different flame temperatures needed for different industrial applications. Thus, such a conventional system is limited to use in operation scenarios with compatible temperature needs, cooling requirements, and energy usage. Hence, there is a long felt need for a more effectively cooled, compact, energy efficient, and widely applicable hydrogen-oxygen fuel generating electrolysis cell system.

A variety of such conventional systems have been disclosed in U.S. patents such as U.S. Pat. Nos. 4,014,777 and 4,081,656 (Brown); U.S. Pat. No. 4,184,931 (Inoue); U.S. Pat. No. 4,339,324 (Haas); U.S. Pat. No. 4,424,106 (Rossoshinsky et al.); and U.S. Pat. No. 5,244,558 (Chiang). The above-mentioned patents describe the production of hydrogen and oxygen in electrolysis units that do not use a liquid coolant. Torches using the fuel gas produced in such units have a very hot flame produced and have no means to adjust the ignition flame temperature.

Some systems try to overcome these shortcomings by circulating liquid coolant through the electrolytic cells or through cooling jackets for the cells. Examples of such cooling jackets are disclosed in U.S. Pat. No. 4,271,793 (Valdespino) and U.S. Pat. No. 5,888,361 (Hirai et al.). The cooling water for the jacket in '361 is supplied from an external water cooling tank to the jacket around the electrolytic cell containing cylindrical bipolar electrodes. Gotz in U.S. Pat. No. 3,990,962 also uses a liquid coolant system for an electrolytic cell containing bipolar electrodes. Such use of liquid coolant, for a system in which oxygen and hydrogen are collected separately, is also disclosed in U.S. application Ser. No. 2003/0091880 (Joos et al.). Hsu in U.S. Pat. No. 4,853,100 describes a system combining a high temperature electrolyzer and a low temperature fuel cell. The system is cooled with a gas and/or liquid coolant such as water, carbon dioxide, or a fluorocarbon.

Another approach to correct for these shortcomings has been through the circulation and recycling of cooled electrolytic solution. Examples of electrolytic solution cooling and recycling are described in U.S. Pat. No. 4,382,849 (Spicer) for a system in which oxygen and hydrogen products are collected separately, in U.S. Pat. No. 4,361,474 (Shoaf et al.) for a similar system used in a hybrid engine vehicle, in U.S. Pat. No. 4,344,831 (Weber) for a system producing hydrogen-oxygen fuel for an internal combustion engine, in U.S. Pat. No. 6,068,741 (Lin) and in U.S. Pat. No. 6,336,430 (de Souza et al.), also for automotive purposes. None of these disclosures include a separate liquid coolant system for the described generator systems.

Nasser in U.S. Pat. No. 4,077,863 tries to combine these two approaches by using a cooling pressure jacket and cooled and recycled electrolytic solution. However both the cooling fluid for the jacket and the circulating electrolytic solution include a gaseous phase for at least part of the circulation cycles.

A third approach to solving the above described shortcomings is disclosed in U.S. Pat. No. 5,799,624 (Hsieh). An electrolytic fueling system for an engine produces hydrogen-oxygen fuel gases from a KOH solution. The produced gases "ascend through a plurality of angled drip plates" for dehydration and then through an acetone container for cooling and decarbonization. The solution water dripped from the drip plates is caught in water absorbing sintered alloy blocks. There is no recycling of electrolytic solution and no liquid coolant circuit.

U.S. Pat. No. 5,082,544 (Willey et al.) and U.S. Pat. No. 3,262,872 (Rhodes) both disclose a means to adjust the flame properties in a torch using hydrogen-oxygen fuel produced by an electrolyzer. Rhodes can use an alkaline electrolytic solution with an air blower cooled cell in the '872 system. Gases produced are passed through a methanol or equivalent fluid tank to reduce the oxygen content of the mix and to prevent excessive oxidizing of welded surfaces.

On the other hand, Willey et al. modifies the hydrogen-oxygen fuel gases in order to obtain a neutral welding torch flame. The '544 system is made up of concentrically located nested electrode tubes using metal hydroxide, such as KOH, dissolved in water as an electrolyte. The produced hydrogen-oxygen fuel gas is bubbled through water in a de-mister along a meandering path past a plurality of horizontal plates in order to remove any KOH vapor contaminant. Residual moisture vapor is then coalesced onto a filter in order to fully dry the mixed fuel gas. Then the produced hydrogen-oxygen fuel gas is bubbled through a volatile combustible liquid, preferably hydrocarbon, prior to being sent to a flash arrestor and then on to a gas welding torch. Preferred volatile combustible liquids are toluene, hexane, heptane, methanol, ethanol and ketones such as acetone, butanone, etc. The temperature of the working fluid (electrolytic solution) is monitored and kept in the range of 55–75° C. with actuating fans. There is no recycling and circulating of the working fluid to a cooling site outside of the cell. Neither is there a liquid coolant used for temperature control.

None of the above-described art combines a liquid coolant process with ignition flame temperature modification. Neither do any of them have a combined cooling system of both a liquid coolant circuit through the generator and cooled electrolytic solution circulation and recycling. Further, none of the electrolytic cells described in the above cited art are the same as the cells used in the present novel system which also includes a combined cooling system of both a liquid coolant circuit through the generator and cooled electrolytic solution circulation and recycling as well as ignition flame temperature modification of the mixed fuel gas produced.

Hence, the novel system herein presented can better address the shortcomings of the currently used conventional systems than can the prior art systems. Additionally, the novel system herein presented can better meet the need for a more effectively cooled, compact, energy efficient, and widely applicable hydrogen-oxygen fuel generating electrolysis cell system.

OBJECTS OF THE INVENTION

In order to achieve the objectives of the invention, the mixed hydrogen-oxygen fuel generator system in this invention uses an electrolytic solution to generate gaseous hydrogen-oxygen fuel with an improved and optimally effective cooling system. This novel generator system includes at least one electrolytic cell with multiple metallic plates used as an internal isolation system in which two of the plates separately connect to both the positive and negative terminal of a DC circuit. The cell contains electrolytic solution that generates hydrogen-oxygen fuel under pressure by using the bipolar plates to carry out electrolysis of the electrolytic solution.

As an illustration of this invention, a motor pumps the electrolytic solution out of the cell resulting in recirculation via the water cooling tank. Each of the two cell terminal plates has a temperature sensing switch as part of the cell temperature control mechanism. Since during operation the electrolytic cell temperature will gradually increase, the cooling system will be automatically turned on when the temperature is in excess of approximately 30° C. The cooling system also contains a water cooling tank in which there are two zones: one is the electrolytic solution circulation coil and the another is a water circulation zone. This latter zone provides circulating cooling water used to adjust the temperature of the electrolytic solution within the electrolysis cell(s) to be within a predetermined temperature range. By controlling the temperature in this manner overheating is prevented and cell operation stoppage due to cell overheating is avoided. The cooling effect of the cooling water also assists in precipitating moisture out of the generated gases such as onto a series of angled drip plates. Thus, continuous 24 hours operation can be achieved with better efficiency and energy generation than what is seen in conventional systems.

The bipolar (+) (−) electrode plate design provides low electricity consumption and therefore reduced risk of electrocution. Further, cooling with pumped, circulated electrolytic solution provides more effective cooling than is seen in the above described conventional systems. Inclusion of a drip plate section not only can help to cut down the water content in the product gases, but also reduces losses of electrolytic solution thereby increasing efficiency. Additionally, a temperature-lowering fluid tank is used to adjust the flame ignition temperature of the gaseous hydrogen-oxygen fuel in order to meet the needs of different industrial applications.

Thus, it is an objective of this invention to present a novel and convenient mixed hydrogen-oxygen fuel generator system.

This novel mixed hydrogen-oxygen fuel generator system has a more efficient production methodology due to reduction of losses of electrolytic solution and a cooler operational temperature of the electrolytic cell(s).

Another objective of this invention is to present a mixed hydrogen-oxygen fuel generator system that has improved cooling through the use of cooling, circulating and recycling of the electrolytic solution as well as through the use of a water,coolant conduit passing through the system.

A further objective of this invention is to disclose a new mixed hydrogen-oxygen fuel generator system that uses a temperature-control fluid cell to adjust, as needed, the flame ignition temperature of the gaseous fuel in order to meet the requirements of different industrial applications.

Yet another objective of this invention is to provide a safer mixed hydrogen-oxygen fuel generator system with better insulation and operation at a lower power setting.

SUMMARY OF THE INVENTION

The instant invention is directed to an improved safer, compact, mobile, and efficient mixed hydrogen-oxygen fuel generator system comprising:

a. at least one electrolytic cell comprised of an electrolytic solution for the production of both hydrogen gas and oxygen gas and of components comprising at least one bipolar electrode plate connected to a suitable power source;

b. a water storage tank comprised of a hydrogen and oxygen gas collection upper chamber, a means to remove moisture from said gas, a means to cool fluids contained in said storage tank, a means to circulate said fluids contained in said storage tank as needed, and a lower chamber filled with said electrolytic solution to a level adequate for the effective functioning of said system;

c. at least one means to monitor and control operational conditions;

d. a cooling system comprised of:
  i. a source of ice water;
  ii. a circulation conduit for said electrolytic solution;
  iii. a water cooling tank for the cooling of said electrolytic solution, circulating in said circulation conduit, with said ice water;
  iv. a liquid coolant conduit for the flow of a liquid coolant through said generator system; and
  v. at least one pump for pumping said electrolytic solution through said circulation conduit and for pumping said liquid coolant through said liquid coolant conduit;

e. a means to adjust, as needed, the ignition flame temperature of said hydrogen-oxygen fuel produced in said at least one electrolytic cell; and f. a means to transfer said hydrogen-oxygen fuel to a combustion site.

The invention is further directed to an improved safer, compact, mobile, and efficient mixed hydrogen-oxygen fuel generator system comprising:

a. at least one electrolytic cell comprised of components including at least one bipolar electrode plate connected to an appropriate power source and an alkaline electrolytic solution for the production of both hydrogen gas and oxygen gas;

b. a water storage tank comprised of a hydrogen and oxygen gas collection upper chamber, a means to remove moisture from said gas, a means to cool fluids contained in said storage tank, a means to circulate said fluids contained in said storage tank as needed, and a lower chamber filled with said electrolytic solution to a level adequate for the proper functioning of said system;

c. at least one means to monitor and control operational conditions;

d. a cooling system comprised of:
  i. a source of liquid coolant;
  ii. a circulation conduit for said electrolytic solution;
  iii. a liquid cooling tank for the cooling, with said liquid coolant, of said electrolytic solution circulating in said circulation conduit;
  iv. a liquid coolant conduit for the flow of said liquid coolant through said generator system; and v. at least one pump for pumping said electrolytic solution through said circulation conduit and for pumping said liquid coolant through said liquid coolant conduit;

e. a means to adjust, as needed, the ignition flame temperature of said hydrogen-oxygen fuel produced in said at least one electrolytic cell; and f. a means to transfer said hydrogen-oxygen fuel to a combustion site; wherein said means to adjust ignition flame temperature is selected from the group of methods consisting of a first method comprised of passing air through a temperature-lowering fluid and mixing said air passed through said temperature-lowering fluid with said hydrogen-oxygen fuel prior to said transfer of said hydrogen-oxygen fuel to said combustion site and a second method comprised of passing said hydrogen-oxygen fuel through a temperature-lowering fluid prior to said transfer of said hydrogen-oxygen fuel to said combustion site.

The invention also provides an improved safer, compact, mobile, and efficient mixed hydrogen-oxygen fuel generator system comprising:

a. at least one electrolytic cell comprised of an alkaline electrolytic solution for the production of both hydrogen gas and oxygen gas and of components including at least one bipolar electrode plate connected to a power source;

b. a water storage tank comprised of a hydrogen and oxygen gas collection upper chamber, an inside of said upper chamber to which are secured at least two layers of drip plates at angles adequate to cause rising gases to rise in a zig-zag fashion, a means to remove moisture from said gas, a means to cool fluids contained in said storage tank, a means to circulate said fluids contained in said storage tank as needed, and a lower chamber filled with said electrolytic solution to a level adequate for the effective functioning of said system;

c. at least one means to monitor and control operational conditions;

d. a cooling system comprised of:
  i. a source of liquid coolant;
  ii. a circulation conduit for said electrolytic solution;
  iii. a liquid cooling tank for the cooling, with said liquid coolant, of said electrolytic solution circulating in said circulation conduit;
  iv. a liquid coolant conduit for the flow of said liquid coolant through said generator system; and
  v. at least one pump for pumping said electrolytic solution through said circulation conduit and for pumping said liquid coolant through said liquid coolant conduit;

e. a means to adjust, as needed, the ignition flame temperature of said hydrogen-oxygen fuel produced in said at least one electrolytic cell; and f. a means to transfer said hydrogen-oxygen fuel to a combustion site; wherein said means to remove moisture from said gas comprises said at least two layers of drip plates causing the precipitation of water vapor out of said rising gases.

The present invention provides the following advantages over the prior art:

(1) The use of high voltage, low current electrolysis for hydrogen gas generation can save on electricity use and increase the amount of hydrogen gas generated and reduce the volume required for the electrolytic tank.

(2) The new system allows for quick production of gases namely hydrogen and oxygen and there is no need for a gas storage facility.

(3) The unique setup can generate gas readily on demand. When the system is not being used there is no hydrogen/oxygen gases present therefore resulting in a reliable and safe system.

(4) In operation the system can regulate and control the temperature in the range from 800° to 3000° C.

(5) The system also has the advantage of reducing the generation of water vapor by using an ice bath recirculation system for cooling.

DETAILED DESCRIPTION OF THE INVENTION

Figure 1:
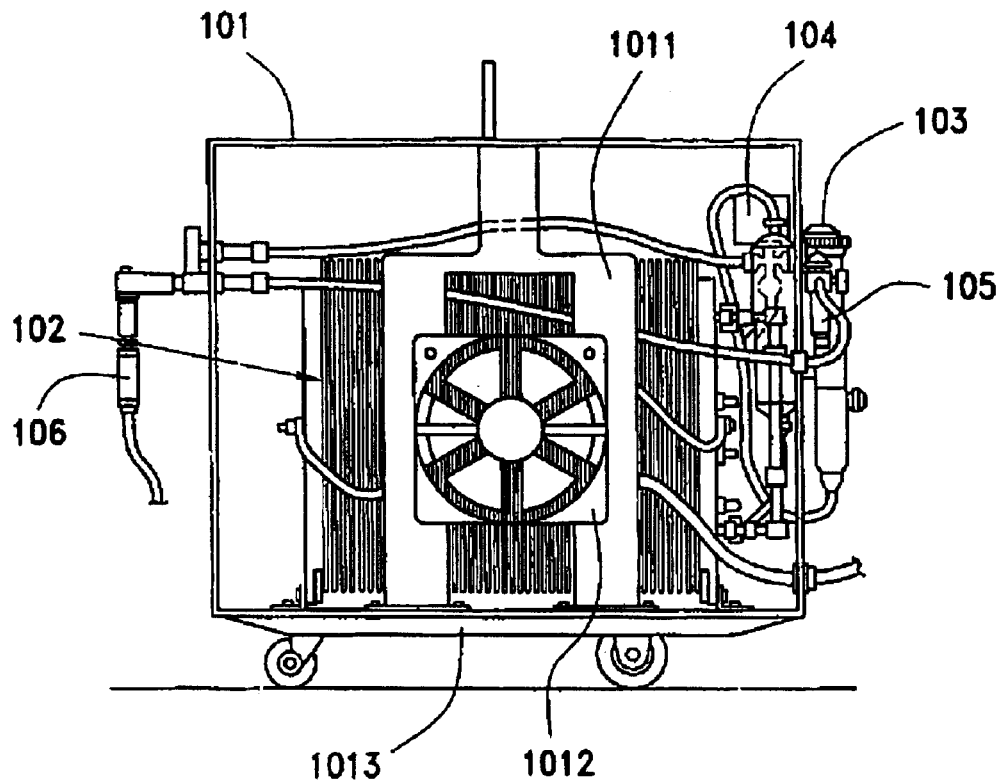
FIG. 1 is a side view diagram of a conventional mixed hydrogen-oxygen fuel generator system.
Figure 2:
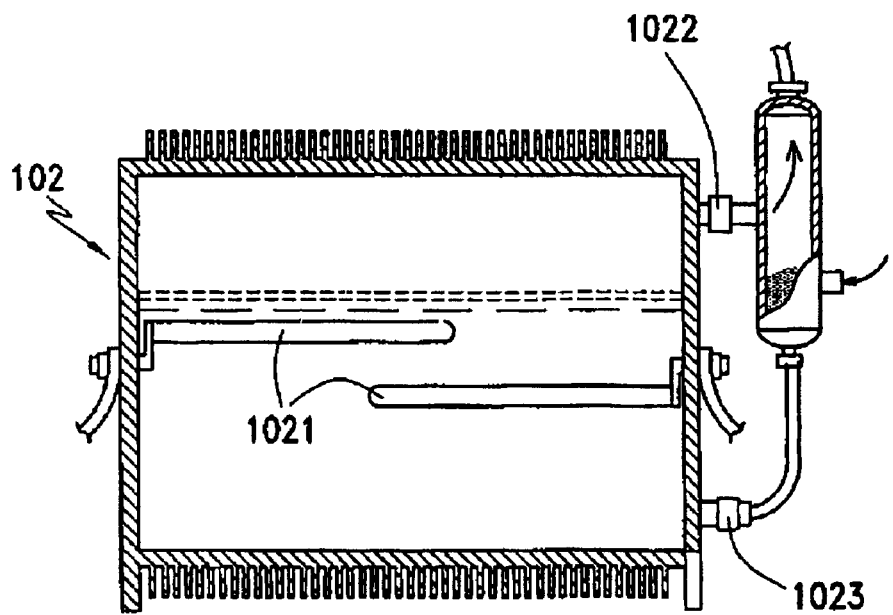
FIG. 2 is a cross-sectional view of part of the first diagram, illustrating the internal cell structure of a conventional mixed hydrogen-oxygen fuel generator system.

The conventional mixed hydrogen-oxygen generator shown in FIGS. 1 and 2 includes a generator body framework (101) on which an electrolytic chamber (102) is built. On top of the body frame is a ∏-shaped support frame (1011). Inside of the body framework is a cooling fan (1012).

Electrolytic chamber (102), a sealed hollow structure, is situated at the center of the foundation platform (1013). On both left and right internal sides and not extending inward are (+) (−) electrolytic rods (1021) in contact with electrolytic solution of suitable height. Gas outlet (1022) is situated at the upper part of the sidewall of the electrolytic chamber (102) whereas water inlet (1023) is situated at the lower part. The gas outlet of electrolytic chamber (102) is connected on the outside to a watertight backfire prevention system (103). This watertight backfire prevention system (103) is a hollow tube-like structure located on the outside of generator body frame (101).

A pressure regulator control valve (104), used to maintain a specified gas pressure range for gases generated in the electrolytic chamber, is located on the inside of the generator body frame (101) and is also connected by tubing to the watertight backfire prevention system (103).

A gas dessicator (105), also located on the outside of generator body frame (101), is a hollow structure connected by tubing to a pressure control valve (104). A cylindrical backfire prevention system (106) has its inlet connected to the above mentioned gas dessicator (105) and its outlet connected to a burner (not shown) that is supplied with the product gases as fuel.

Although the above-described conventional system can generate hydrogen and oxygen gases from the electrolysis of water and collect the combined product gases produced in closed electrolytic chamber (102), it is a system with huge electricity consumption given the design of the electrolytic rods (1021). Another weakness is in the cooling process that is not ideal because it only uses the cooling effect of cooling fan (1012) to lower the temperature of the electrolytic solution in electrolytic chamber (102). In actual practice, the operation often stops because of overheating. A third shortcoming of such a conventional hydrogen-oxygen generating system is that the combustion flame temperature is fixed, and therefore cannot adjust to the requirements of different flame temperatures needed for different industrial applications. Thus, such a conventional system is limited to use in operation scenarios with compatible temperature needs, cooling requirements, and energy usage.

Figure 3:
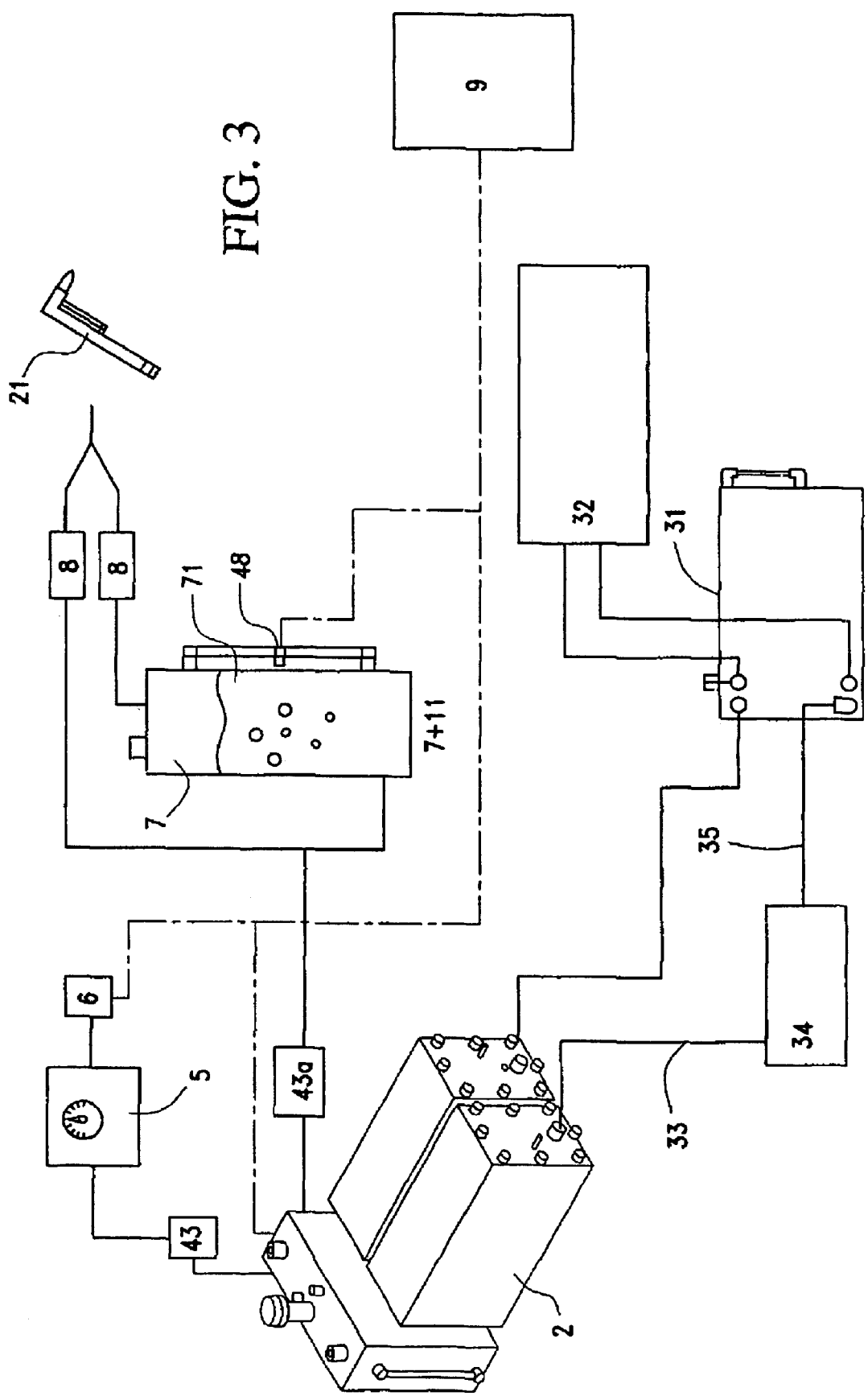
FIG. 3 is the system flow diagram for an electrolytic cell of the present invention. Flow lines are representative and do not accurately portray connection sites.

FIGS. 3–6 illustrate one embodiment of the present novel, mixed hydrogen-oxygen fuel generation system. As seen in FIG. 3, this system mainly consists of a generator body frame (1), two electrolytic cells (2), an icebox (3), water storage tank (4), pressure regulator (6), temperature-lowering fluid tank (7), backfire prevention device (8), and power-source controller (9). Generator body frame 1, shown in FIG. 4, includes a generally hollow rectangular metallic shell (11) and multiple mechanical wheels (12) located at the bottom of the generator body frame with appropriate openings for airflow, air outlets, power course placement (not shown in the diagram) and other necessary components.

Figure 4:
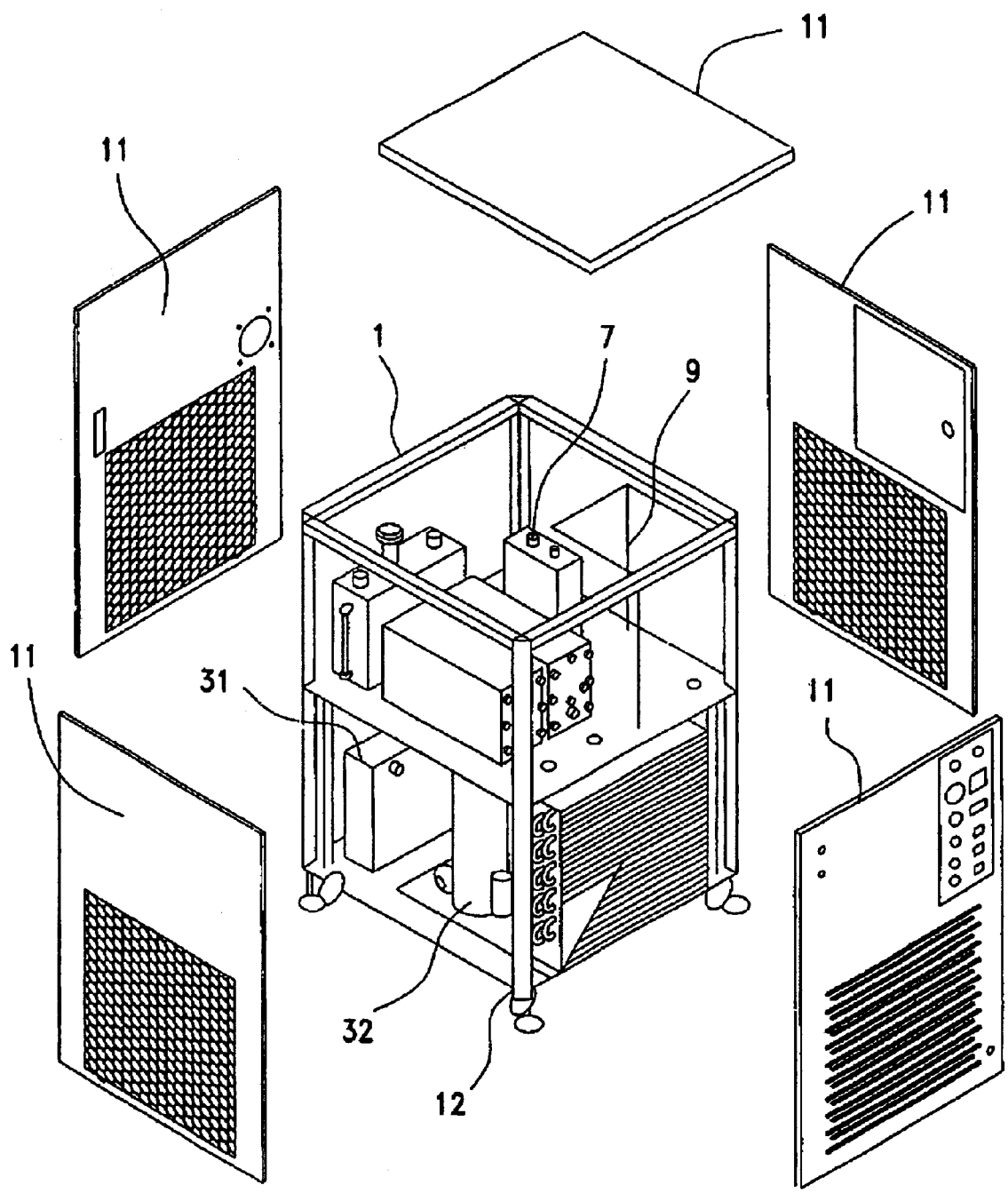
FIG. 4 is the assembly diagram for this invention showing the relative positioning of the generator system components.
Figure 5:
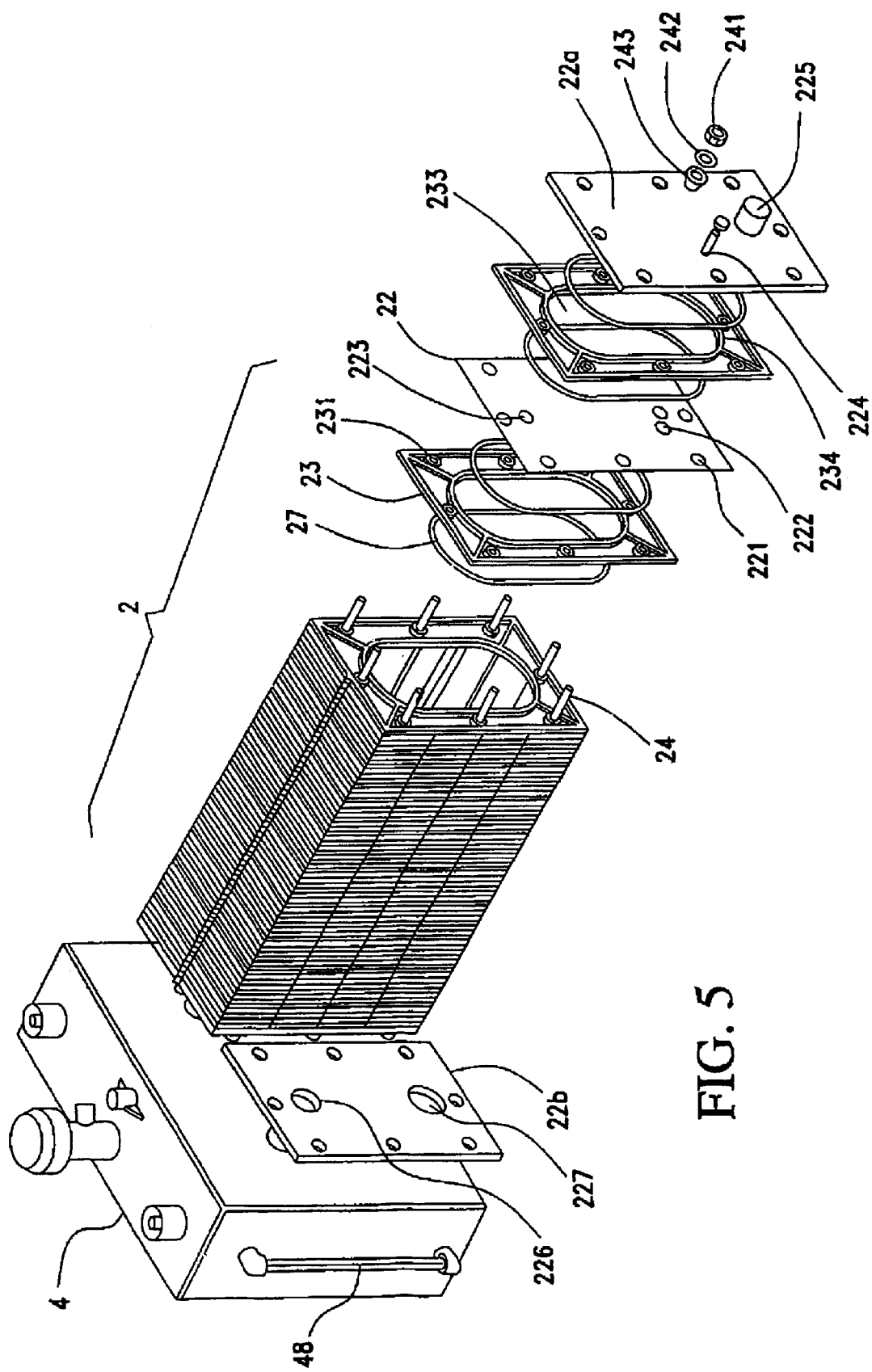
FIG. 5 depicts the plate and partition set-up for a cell of this invention including features such as positioning means, bipolar plates, fluid inlets and outlets, and leakage prevention washers and traps.

Two units of electrolysis cell 2 are secured to the upper part of generator body frame 1, as seen in FIG. 4. Each cell consists of a rectangular tank structure, such as illustrated by FIG. 5. Along the inner length of the cell body frame, multiple parallel rectangular metallic plates (22) are installed. Each of them is isolated by an insulating partition (not numbered, but including features 231,232,and 233). Multiple first locating holes (221) are placed at the external opening of each plate (22). They are mated to corresponding locating rods (24) which run lengthwise along the cell body frame. This allows for secure, sequential location of each insulated plate along the length of the cell body. The lower part of plate 22 contains pair wise puncture holes (222) for circulation of the electrolytic solution (25). The upper part of plate 22 contains an airflow hole (223) to allow gaseous hydrogen-oxygen to circulate.

The outer dimension of the insulating partitions is similar to that of the plates (22). Along the outer edge of each partition is a linked protruding edge (231). The inner side boundary of protruding edge (231) corresponds to the first locating hole (221) position. There are also multiple second locating holes (232) corresponding to the above-described position-locating rods (24). On the inner side of the second locating holes (232), there is a slightly oval-shaped hollow gas-water orifice (233) with an upper edge higher than the airflow hole (223) of plate (22) and with a lower edge lower than the water-flow hole (222). This allows electrolytic solution (25) and mixed hydrogen-oxygen gas (26) to flow lengthwise along the cell body frame via gas-water flow hole(s) (233). Around the gas-water flow hole (233) and on both sides of the partition, there is a ring shaped sunken trap or annular groove (234) set in the washer (27) and able to prevent the escape of the electrolytic solution (25) and gaseous hydrogen-oxygen (26) along the body of partition or through a region outside of the gas-water orifice (223).

The two electrolytic cells (2) are separately connected by terminal 224 (depicted on bipolar plate 22a in FIG. 5) to the DC (+) (−) terminal of a rectifier (not shown in the figure) at a position farthest away from the two bipolar plates (22b) which are adjacent to the sides of the water storage tank.

Each locating rod (24) is placed sideways and secured by a nut (241). The bipolar plate (22b) on each cell (2) is adjacent to the sides of the water storage tank (4). Each bipolar plate (22b) has a gas outlet (226) on top and a water inlet (227) at the bottom, both connected to the corresponding openings of the water storage tank (4).

In a preferred embodiment, KOH is used as the electrolyte and the optimum volumetric ratio for the electrolytic solution (25) is:

KOH: $H_2O$=2: 20±0.05

The electrolysis process in cell 2 that produces gaseous hydrogen-oxygen can easily generate high temperatures in this novel inventive system. Therefore as seen in FIGS. 3 and 4, an ice water generator source (32) is used to provide cooling water for a circulatory cooling system that can suitably lower the temperature as needed. The cooling water cools both the electrolytic solution passing through a coil in the water cooling tank and the water storage tank/cell generator via passage through an internal circulation conduit. In the embodiment depicted in FIG. 4, this cooling system includes a water cooling tank (31) located below the water storage tank (4) and the cells (2) and also an ice water generator (32), placed in front of water cooling tank (31). The generated ice water is used to cool the internal fluid of water cooling tank (31). The inlet of water cooling tank (31) connects via the first water-inlet pipes (33), the lift pump (34), and the second water inlet pipes (35) to the corresponding water outlets (225) of bipolar plates (22a) on the far side of electrolysis cell tanks (2), that is to say, far from bipolar plates (22b) connected to the sides of the water storage tank as seen in FIG. 5. The water outlet of the water cooling tank (31) is connected by pipelines (shown unlabelled in FIG. 3) to the water inlet (227) of the water storage tank (4).

The electrolytic solution inside the electrolysis cell(s) (2) is pumped by the lift pump (34) to the lower part of the water cooling tank (31) where it is cooled as needed by the cooling water. After circulating back to the water storage tank (4) the cooled electrolytic solution returns to cell(s) (2) and continues to provide a circulatory cooling effect throughout the system.

Figure 6:
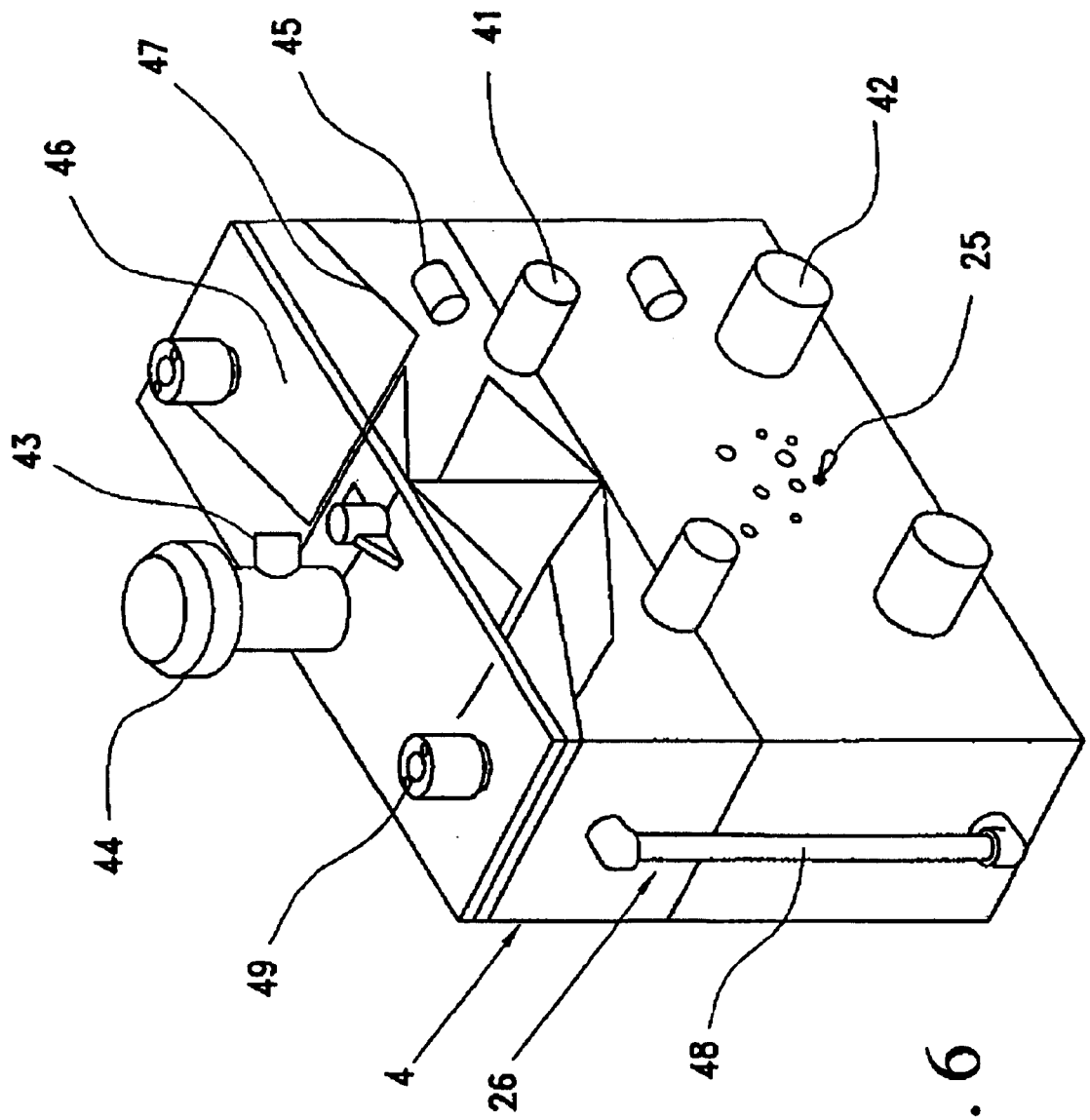
FIG. 6 details the water storage tank for this invention including features such as drip plates, explosion prevention system, openings for the passage of various fluids including for coolants, and a fluid level sensor.

In FIG. 5, the water storage tank 4 is seen to be located at one side of the bipolar plate(s) (22b) of the two cell units (2). The details for this water storage tank are shown in FIG. 6 and are of particular interest. FIG. 6 shows that the upper part of the water storage tank 4 is provided with a gas outlet (43) and a fluid supply opening (44). These are connected to air flow opening 41 and water flow opening 42 which are located on one side of the bipolar plate (22b, FIG. 5) between gas/air outlet 226 and water inlet 227 of each plate 22b. After electrolytic solution 25 is added to the water storage tank (4) through the fluid supply opening (44), it will then circulate within this set-up via each water flow tank outlet opening 42 (FIG. 6), each cell plate water inlet opening 227 (FIG. 5), and between the plate water flow openings (222) and the air-water flow openings (233) of the insulating partitions until once more pumped out to the water cooling tank (31) by lift pump (34).

The gaseous hydrogen-oxygen (26) generated by electrolysis in cell(s) 2, will be outputted via part of the air-water flow opening (233) of each insulating partition, by the air flow opening (223) of each plate (22), by the air outlet (226) of each bipolar plate (22b), by air flow opening(s) 41 and by gas/air output opening 43 of the water storage tank (4). On one side of water storage tank 4 adjacent to air flow opening 41, there is a cooling water opening (45) that is connected to the terminal outlet pipeline of the above-described water cooling tank (31). The cooling water entering at opening 45 assists in the temperature control of the water storage tank (4).

On the upper corner of the water storage tank (4) is a gas-collecting chamber (46) that is used to collect the mixed hydrogen-oxygen gas produced by the cell(s) (2). Inside the chamber there are multiple layers of drip plates (47), each with a specified inclination angle. The upper and lower layers of the water drip plates (47) are required to be anchored at different angles on the corresponding sides inside the water storage tank (4). Also, the free terminal end of each drip plate 47 retains a certain distance from the drip plate above it in order to allow the gaseous hydrogen-oxygen (26) to climb from below the drip plates to along and through each layer of drip plates (47) in a zigzag fashion to reach gas outlet 43. This process allows the water vapor content of the gaseous hydrogen-oxygen (26), via cooling and precipitation onto the flow obstructing and flow resisting drip plates (47), to drip back into the water storage tank (4) thereby reducing losses of electrolytic solution (25).

A fluid level sensor (48) in placed inside the water storage tank (4). When the fluid level of the electrolytic solution (25) is decreased to a certain pre-determined level, this sensor will trigger the power source controller (9) to automatically replenish electrolytic solution (25) via fluid supply outlet 44.

A pair of explosion prevention switches (49) are placed on top of the water storage tank (4). They are used to prevent explosions caused by excessive pressure build-up, flashback, or backfire of the gaseous hydrogen-oxygen inside the gas collection chamber (46).

As shown in FIG. 3, the gaseous hydrogen-oxygen coming from the water storage tank is connected by pipeline to pressure regulator (6) in which the pressure of the regulator (6) is slightly higher than the operational pressure used. Since the volume of the electrolytic cell and the water storage tank is not large, the gaseous hydrogen-oxygen (26) will attain operational pressure approximately 30 seconds after this system starts operating and is ready to operate with the objective of simultaneously achieving continuous fuel production and continuous fuel supply to a combustion site. The pressure regulator (6) is also coupled to the power supply controller (9). When the pressure is too high, the power supply controller (9) will automatically cut off the power supply for electrolysis in order to prevent explosion. In this system the acceptable, unable pressure range is between 0.5 and 5 kg/cm$^2$ and the preferred operational pressure is 1.5 kg/cm$^2$.

After passing through pressure regulator 6, the gaseous hydrogen-oxygen (26) then enters the lower compartment of the temperature-lowering fluid tank (7) located in the generator body frame (1). An appropriate amount of temperature-lowering fluid is in tank 7. After the gaseous hydrogen-oxygen (26) is mixed with the temperature-lowering fluid and bubbled up through the temperature-lowering fluid from a lower level to an upper level, it is outputted through the upper compartment of the temperature lowering fluid tank (7). By this method, the ignition flame temperature of the gaseous hydrogen-oxygen (26) can be lowered in order to meet the requirements of different industrial needs.

In the present novel system, the preferred temperature-lowering fluid is selected from the liquefied ethane family (e.g. n-ethane and derivatives thereof) which allows the carbon compound to lower the gaseous hydrogen-oxygen (26) from a 2800° C. ignition temperature to within the range of 800° C.~1500° C., a range applicable to industries such as steel welding (required flame ignition temperature of 1200° C.). In another embodiment, dry air is passed through the temperature-lowering fluid tank (7). After that, this air, containing some entrained temperature lowering fluid, is mixed together with the gaseous hydrogen-oxygen (26).

As shown in FIG. 3, the back-fire prevention device (8) is connected to the outlet side of the temperature-lowering fluid tank (7) and is used to protect the system function through the prevention of backfire phenomena resulting from an improper operational situation. The gaseous hydrogen-oxygen (26) can be used for industrial applications after passing through the backfire prevention device (8), for instance as fuel for welding torch 21.

The power source controller (9) is used to control each component power source and its integral operation. Included are the power source control in the electrolytic cell(s) (2), fluid level control controlling the water replenishing system of the electrolytic cell, radiation control controlling the high temperature generated in electrolysis and driving the cooling device, warning signal control, and other essential control functions. In this embodiment, when the air pressure in the electrolytic cell(s) (2) reaches 1.5 kg/cm$^2$, the controller will automatically cut off power and stop the gas generation. The warning signal control component displays system normal/abnormal operational states including warning lights for the power source, for water level, for oil level, for gas generation, etc.

According to the above-described structure and operation principles, the present novel invention when compared to the conventional mixed hydrogen-oxygen fuel generation systems possesses the following advantages and improvements:

1. Conventional system use current electrolysis with an electrolytic rod design that consumes large amounts of electricity. The present invention uses (+) (−) bipolar electrode plate design and lower consumption of electricity. This plate design allows for the use of a smaller system volume to generate gas in comparison to that used with the electrolytic rod design. Thus more efficient power consumption is achieved.
2. The present invention uses an insulated plate design. Except for (+) (−) plates (22a and 22b), all external sides of other plates (22) are covered by insulating partitions which insulate against conduction to the outer shell of the electrolytic cell(s) (2). Thus the present invention reduces the danger of electrocution.
3. The present invention circulates cooled electrolytic solution throughout the system using a lift pump and an ice-water cooler (3) for cooling. Therefore the present invention has better heat exchange accomplished than a conventional simple air cooling design can provide. Hence overheating is avoided as is generator stoppage due to overheating conditions.
4. Perhaps most important, the temperature-lowering tank (7) can lower the ignition flame temperature of the hydrogen-oxygen gas in order to meet different industrial needs such as in the steel-copper welding industry. Hence the present novel invention can be useful to a wider range of applications than can be achieved by conventional hydrogen-oxygen generators.

Note that the above discussion of this novel inventive system, including the diagrams and descriptions, can lead to wider applications. The examples presented herein are illustrative of the present invention and should not be construed as limiting. For those well-versed in this technology, other embodiments within the scope and spirit of this invention may come to mind. For instance, a feature can be changed or modified such as by changing the number of electrolytic cells from 2 to 1, or by modifying the type of drip plate (47). All such modifications fall within the scope and spirit of this disclosure and the following claims.

What is claimed is:

1. An improved safer, compact, mobile, and efficient mixed hydrogen-oxygen fuel generator system comprising:
   a. at least one electrolytic cell comprised of an electrolytic solution for the production of both hydrogen gas and oxygen gas and of components comprising at least one bipolar electrode plate connected to a suitable power source;
   b. a water storage tank comprised of a hydrogen and oxygen gas collection upper chamber, a means to remove moisture from said gas, a means to cool fluids contained in said storage tank, a means to circulate said fluids contained in said storage tank as needed, and a lower chamber filled with said electrolytic solution to a level adequate for the effective functioning of said system;
   c. at least one means to monitor and control operational conditions;
   d. a cooling system comprised of:
      i. a source of ice water;
      ii. a circulation conduit for said electrolytic solution;
      iii. a water cooling tank for the cooling of said electrolytic solution, circulating in said circulation conduit, with said ice water;
      iv. a liquid coolant conduit for the flow of a liquid coolant through said generator system; and
      v. at least one pump for pumping said electrolytic solution through said circulation conduit and for pumping said liquid coolant through said liquid coolant conduit;
   e. a means to adjust, as needed, the ignition flame temperature of said hydrogen-oxygen fuel produced in said at least one electrolytic cell; and
   f. a means to transfer said hydrogen-oxygen fuel to a combustion site.

2. A system as described in claim 1 wherein said gas collection upper chamber further comprises an inside to which are secured at least two layers of drip plates at angles adequate to cause rising gases to rise in a zig-zag fashion.

3. A system as described in claim 2 wherein said at least two layers of drip plates cause the precipitation of water vapor out of said rising gases.

4. A system as described in claim 1 wherein said means to adjust ignition flame temperature comprises passing said hydrogen-oxygen fuel through a temperature-lowering fluid prior to said transfer of said hydrogen-oxygen fuel to said combustion site.

5. A system as described in claim 4 wherein said temperature-lowering fluid is selected from the family of liquefied ethane and ethane derivatives.

6. A system as described in claim 1 wherein said at least one means to monitor and control operational conditions is selected from the group consisting of pressure sensors and regulators, fluid level sensors and regulators, power controllers, backfire prevention devices, flashback prevention devices, explosion prevention devices, temperature sensors and regulators, and combinations thereof.

7. A system as described in claim 1 wherein said at least one means to monitor and control operational conditions consists of effectively located devices including at least one pressure sensor and regulator, at least one fluid level sensor and regulator, at least one power controller, at least one backfire prevention device, at least one explosion prevention device, and at least one temperature sensor and regulator.

8. A system as described in claim 1 wherein said at least one electrolytic cell further comprises at least one metal plate with two sides wherein each of said two sides is insulated by an insulating partition.

9. A system as described in claim 8 wherein said components of said at least one electrolytic cell are secured sequentially in place by at least two position locating rods that are placed lengthwise along said at least one electrolytic cell, and wherein each of said at least two locating rods is run through a series of corresponding locating holes placed in each of said components.

10. A system as described in claim 1 wherein said alkaline electrolytic solution is comprised of KOH and water.

11. A system as described in claim 10 wherein said alkaline electrolytic solution is comprised of KOH and water in a volumetric ratio of KOH: $H_2O=2:20\pm0.05$.

12. A system as described in claim 9 wherein said at least one metal plate has at least one airflow hole and at least one water flow hole and wherein, when placed in said at least one electrolytic cell, said at least one airflow hole is located above said at least one water flow hole.

13. A system as described in claim 12 wherein said insulating partition is comprised of a protruding edge, said locating holes corresponding to said locating rods, and an oval shaped gas-water orifice and wherein, when placed in said at least one electrolytic cell, said gas-water orifice has an upper edge higher than said at least one air flow hole and a lower edge lower than said water flow hole so that both liquids and gases can flow lengthwise along said at least one electrolytic cell.

14. A system as described in claim 13 wherein said gas-water orifice has two gas-water orifice sides, each of said gas-water orifice sides sealed with a corresponding washer containing a means to prevent the escape of said electrolytic solution, said oxygen gas, and said hydrogen gas.

15. A system as described in claim 14 wherein said means to prevent the escape of said electrolytic solution, said oxygen gas, and said hydrogen gas is selected from the group consisting of a ring shaped sunken trap and an annular groove.

16. A system as described in claim 1 wherein said at least one electrolytic cell consists of two parallel electrolytic cells.

17. A system as described in claim 1 wherein said means to adjust ignition flame temperature comprises passing air through a temperature-lowering fluid and mixing said air passed through said temperature-lowering fluid with said hydrogen-oxygen fuel prior to said transfer of said hydrogen-oxygen fuel to said combustion site.

18. A system as described in claim 17 wherein said temperature-lowering fluid is selected from the family of liquefied ethane and ethane derivatives.

19. An improved safer, compact, mobile, and efficient mixed hydrogen-oxygen fuel generator system comprising:
   a. at least one electrolytic cell comprised of components including at least one bipolar electrode plate connected to an appropriate power source and an alkaline electrolytic solution for the production of both hydrogen gas and oxygen gas;
   b. a water storage tank comprised of a hydrogen and oxygen gas collection upper chamber, a means to remove moisture from said gas, a means to cool fluids contained in said storage tank, a means to circulate said fluids contained in said storage tank as needed, and a lower chamber filled with said electrolytic solution to a level adequate for the proper functioning of said system;

c. at least one means to monitor and control operational conditions;

d. a cooling system comprised of:
   i. a source of liquid coolant;
   ii. a circulation conduit for said electrolytic solution;
   iii. a liquid cooling tank for the cooling, with said liquid coolant, of said electrolytic solution circulating in said circulation conduit;
   iv. a liquid coolant conduit for the flow of said liquid coolant through said generator system; and
   v. at least one pump for pumping said electrolytic solution through said circulation conduit and for pumping said liquid coolant through said liquid coolant conduit;

e. a means to adjust, as needed, the ignition flame temperature of said hydrogen-oxygen fuel produced in said at least one electrolytic cell; and f. a means to transfer said hydrogen-oxygen fuel to a combustion site;

wherein said means to adjust ignition flame temperature is selected from the group of methods consisting of a first method comprised of passing air through a temperature-lowering fluid and mixing said air passed through said temperature-lowering fluid with said hydrogen-oxygen fuel prior to said transfer of said hydrogen-oxygen fuel to said combustion site and a second method comprised of passing said hydrogen-oxygen fuel through a temperature-lowering fluid prior to said transfer of said hydrogen-oxygen fuel to said combustion site.

20. An improved safer, compact, mobile, and efficient mixed hydrogen-oxygen fuel generator system comprising:

a. at least one electrolytic cell comprised of an alkaline electrolytic solution for the production of both hydrogen gas and oxygen gas and of components including at least one bipolar electrode plate connected to a power source;

b. a water storage tank comprised of a hydrogen and oxygen gas collection upper chamber, an inside of said upper chamber to which are secured at least two layers of drip plates at angles adequate to cause rising gases to rise in a zig-zag fashion, a means to remove moisture from said gas, a means to cool fluids contained in said storage tank, a means to circulate said fluids contained in said storage tank as needed, and a lower chamber filled with said electrolytic solution to a level adequate for the effective functioning of said system;

c. at least one means to monitor and control operational conditions;

d. a cooling system comprised of:
   i. a source of liquid coolant;
   ii. a circulation conduit for said electrolytic solution;
   iii. a liquid cooling tank for the cooling, with said liquid coolant, of said electrolytic solution circulating in said circulation conduit;
   iv. a liquid coolant conduit for the flow of said liquid coolant through said generator system; and
   v. at least one pump for pumping said electrolytic solution through said circulation conduit and for pumping said liquid coolant through said liquid coolant conduit;

e. a means to adjust, as needed, the ignition flame temperature of said hydrogen-oxygen fuel produced in said at least one electrolytic cell; and f. a means to transfer said hydrogen-oxygen fuel to a combustion site;

wherein said means to remove moisture from said gas comprises said at least two layers of drip plates causing the precipitation of water vapor out of said rising gases.

* * * * *